(12) United States Patent
Nakamura et al.

(10) Patent No.: US 11,693,093 B2
(45) Date of Patent: Jul. 4, 2023

(54) DISTANCE-MEASURING APPARATUS THAT OUTPUTS PRECISION INFORMATION

(71) Applicant: FANUC CORPORATION, Yamanashi (JP)

(72) Inventors: Minoru Nakamura, Yamanashi (JP); Yuuki Takahashi, Yamanashi (JP); Atsushi Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1013 days.

(21) Appl. No.: 16/412,429

(22) Filed: May 15, 2019

(65) Prior Publication Data

US 2019/0383906 A1     Dec. 19, 2019

(30) Foreign Application Priority Data

Jun. 13, 2018   (JP) ................................. 2018-112665

(51) Int. Cl.
| | | |
|---|---|---|
| *G01S 7/48* | (2006.01) | |
| *G01S 7/497* | (2006.01) | |
| *G01S 17/10* | (2020.01) | |

(52) U.S. Cl.
CPC ............ *G01S 7/4808* (2013.01); *G01S 7/497* (2013.01); *G01S 17/10* (2013.01)

(58) Field of Classification Search
CPC ......... G01S 7/4808; G01S 7/497; G01S 17/10
See application file for complete search history.

(56) References Cited

U.S. PATENT DOCUMENTS

| | | | |
|---|---|---|---|
| 7,408,627 B2 * | 8/2008 | Bamji | ...................... G01C 3/08 356/5.1 |
| 2003/0223618 A1 | 12/2003 | Cahill et al. | |
| 2010/0046802 A1 * | 2/2010 | Watanabe | ............. G01S 17/894 348/46 |
| 2016/0161610 A1 | 6/2016 | Hiromi | |

FOREIGN PATENT DOCUMENTS

| | | |
|---|---|---|
| DE | 102013207654 A1 | 11/2013 |
| DE | 102014204423 A1 | 9/2015 |
| JP | 2009-79987 A | 4/2009 |
| JP | 2010-71976 A | 4/2010 |
| JP | 2011-22089 A | 2/2011 |
| JP | 2014-528059 A | 10/2014 |
| JP | 2018-25474 A | 2/2018 |
| JP | 2018025474 A * | 2/2018 |
| WO | 2018/042887 A1 | 3/2018 |

OTHER PUBLICATIONS

Holbrook, Ryan, "Math for Machines: Understanding Eignenvalues and Singular Values." https://mathformachines.com/posts/eigenvalues-and-singular-values/ (Year: 2019).*

* cited by examiner

*Primary Examiner* — Isam A Alsomiri
*Assistant Examiner* — Joseph C Fritchman
(74) *Attorney, Agent, or Firm* — Hauptman Ham, LLP

(57) ABSTRACT

A distance-measuring apparatus includes a precision calculation section that calculates a precision for each pixel, the precision based on a relation among the amounts of the electric charges stored at a plurality of timings that respectively delay by certain phases from a timing of the emission of the measuring light, wherein the precision is outputted from the distance-measuring apparatus.

8 Claims, 9 Drawing Sheets

FIG. 7

| | | PRECISION IN CASE OF INSUFFICIENT LIGHT INTENSITY | PRECISION IN CASE OF RANDOM NOISE, MOVEMENT OF OBJECT, OR CHANGE IN OUTSIDE LIGHT | | | | | | | |
|---|---|---|---|---|---|---|---|---|---|---|
| 6% | 5% | 10% | 2% | 3% | 3% | 6% | 3% | 5% | | |
| 5% | 6% | 9% | 2% | 3% | 3% | 9% | 6% | 3% | | |
| 6% | 298% | 8% | 3% | 4% | 2% | 9% | 4% | 5% | | |
| 6% | 205% | 11% | 1% | 4% | 3% | 8% | 5% | 4% | | |
| 5% | 4% | 12% | 2% | 3% | 4% | 11% | 4% | 6% | | |
| 5% | 5% | 5% | 3% | 3% | 5% | 8% | 6% | 4% | | |
| 7% | 7% | 12% | 98% | 85% | 91% | 8% | 5% | 5% | | |
| 5% | 5% | 11% | 11% | 14% | 9% | 9% | 4% | 4% | | |
| 5% | 5% | 6% | 12% | 11% | 12% | 11% | 6% | 4% | | |
| 5% | 5% | 5% | 3% | 6% | 160% | 225% | 5% | 5% | | |
| 4% | 5% | 4% | 4% | 4% | 131% | 161% | 4% | 5% | | |
| 4% | 6% | 5% | 4% | 5% | 6% | 6% | 6% | 6% | | |
| 5% | 4% | 6% | 5% | 4% | 5% | 7% | 5% | 6% | | |

PRECISION DATA

PRECISION IN CASE OF SATURATION

FIG. 8

DISTANCE DATA WITH SINGULAR VALUES OUTPUTTED

| | | | | | | | | | | | | | |
|---|---|---|---|---|---|---|---|---|---|---|---|---|---|
| 3000 | 2999 | 3000 | 3000 | 2999 | 3000 | 3001 | 2999 | 2999 | 2999 | 2999 | 3000 | 3002 | 2999 |
| 3000 | 3000 | 2998 | 3002 | 3002 | 2999 | 2998 | 2998 | 2998 | 3000 | 2999 | 3000 | 3000 | 2998 |
| 3000 | 3001 | 3002 | 3002 | 2999 | 2999 | 3000 | 2998 | 2997 | 2998 | 3000 | 3001 | 3003 | 2999 |
| 2999 | 3000 | 2997 | 3000 | 2999 | 2999 | 9998 | 3000 | 3002 | 3001 | 3001 | 2999 | 2998 | 2998 |
| 3000 | 3001 | 3000 | 3000 | 2998 | 3000 | 9998 | 3000 | 3001 | 1502 | 1505 | 1501 | 3000 | 2999 |
| 3000 | 3000 | 3000 | 2998 | 2998 | 2998 | 9997 | 1498 | 1498 | 1501 | 1502 | 1501 | 3000 | 3001 |
| 3001 | 3000 | 9999 | 9999 | 3000 | 2999 | 9997 | 1497 | 1499 | 1500 | 1500 | 1501 | 3002 | 3001 |
| 3000 | 3000 | 9999 | 9999 | 3001 | 3000 | 9997 | 1499 | 1502 | 1501 | 1498 | 1499 | 3000 | 3001 |
| 2999 | 3000 | 3000 | 3001 | 3000 | 3001 | 2999 | 3002 | 3000 | 3001 | 3001 | 3000 | 3002 | 2999 |
| 3000 | 3000 | 3001 | 3002 | 3001 | 2999 | 3001 | 2999 | 3000 | 3002 | 3000 | 3003 | 2998 |  |
| 3000 | 2998 | 3000 | 3001 | 3002 | 3001 | 3001 | 2999 | 2999 | 3001 | 3000 | 3000 | 3001 | 2999 |

- SINGULAR VALUE FOR INSUFFICIENT LIGHT INTENSITY
- SINGULAR VALUE FOR INADEQUATE PRECISION
- SINGULAR VALUE FOR SATURATION

CORRECTION OF DISTANCE BY USING PRECISION

| DISTANCE | PRECISION% | INVERSE OF PRECISION | WEIGHTED DISTANCE | |
|---|---|---|---|---|
| 997 | 1 | 1.000 | 997 | |
| 1003 | 1 | 1.000 | 1003 | |
| 1008 | 2 | 0.500 | 504 | |
| 980 | 5 | 0.200 | 196 | |
| 1001 | 1 | 1.000 | 1001 | |
| 995 | 2 | 0.500 | 497.5 | |
| 1003 | 1 | 1.000 | 1003 | |
| 1001 | 1 | 1.000 | 1001 | |
| 970 | 7 | 0.143 | 138.5714 | |
| 1002 | 1 | 1.000 | 1002 | |
| AVERAGE | SUM OF PRECISIONS | SUM OF INVERSES OF PRECISIONS | SUM OF WEIGHTED DISTANCES | WEIGHTED AVERAGE |
| 996 | 22 | 7.343 | 7343.071 | 1000.029 |

DISTANCE-MEASURING APPARATUS THAT OUTPUTS PRECISION INFORMATION

RELATED APPLICATIONS

The present application claims priority of Japanese Application Number 2018-112665, filed Jun. 13, 2018, the disclosure of which is hereby incorporated by reference herein in its entirety.

BACKGROUND OF THE INVENTION

1. Field of the Invention

The present invention relates to a distance-measuring apparatus that measures a distance to an object on the basis of the time of flight of light and in particular to a distance-measuring apparatus that outputs precision information.

2. Description of the Related Art

Among distance-measuring apparatuses that measure the distance to an object, TOF (time of flight) cameras that output a distance based on the time of flight of light are known. Many TOF cameras employ a phase difference method in which measuring light, intensity-modulated with a certain period, is radiated to a target space to be measured and the phase difference between the radiated measuring light and the light reflected from an object in the target space to be measured is detected.

In such TOF cameras, a light-sensitive element that captures an image of an object at a very close distance or an object with a very high reflectance may fail to perform distance-measuring because excessively strong reflected light causes saturation. At the same time, a light-sensitive element that captures an image of an object at a very far distance or an object with a very low reflectance may fail to perform distance-measuring because excessively weak reflected light provides insufficient light intensity. In the case of a failure in distance-measuring, a typical TOF camera will output a singular value instead of a distance to indicate the failure in distance-measuring. The user of the distance-measuring apparatus, therefore, considers the output value from the TOF camera to be a correct distance value when the output value is not a singular value.

Apart from the above-described two cases of failure in distance-measuring, however, a TOF camera has a dispersion of distance values due to inevitable random noise, such as shot noise, dark current noise, and thermal noise, and quantization error due to A/D conversion. Further, the precision of distance values may greatly deteriorate due to a movement of the object, an extreme change in the surrounding light, and the like. In order to determine such an abnormality in distance-measuring, a technique is known in which a light-sensitive element is caused to store electric charges at a plurality of timings delaying from the timing of the emission of the measuring light by certain phases and a relation among the amounts of the stored electric charges is used (for example, see the literature 1-3 below).

Japanese Unexamined Patent Publication (Kokai) No. 2009-079987 discloses a distance-measuring apparatus that acquires a first detection signal $\alpha$, a second detection signal $\beta$, a third detection signal $\gamma$, and a fourth detection signal $\delta$ with four kinds of phase differences, i.e., 0°, 90°, 180°, and 270° relative to the timing of the emission of the measuring light, calculates a first sum W1 of the first detection signal $\alpha$ and the third detection signal $\gamma$ and a second sum W2 of the second detection signal $\beta$ and the fourth detection signal $\delta$, and determines that it is not possible to detect the correct phase difference nor to calculate the distance due to external factors such as outside light when the difference $\Delta W$ between the first sum W1 and the second sum W2 is greater than a set value A.

Published Japanese Translation of PCT International Publication for Patent Application (Kohyo) No. 2014-528059 discloses a blur processing apparatus that utilizes the phenomenon that the relation between $Q_1-Q_2$ and $Q_3-Q_4$ is plotted as a rhombus, where $Q_1$, $Q_2$, $Q_3$, and $Q_4$ are the amounts of electric charges acquired in accordance with four control signals $C_1$, $C_2$, $C_3$, and $C_4$ having a 90° phase difference between each other, and determines that a blur has occurred due to a movement of the object, the camera, the background, and the like when a value is plotted in a region different from the position of the rhombus.

Japanese Unexamined Patent Publication (Kokai) No. 2011-022089 discloses a spatial information detecting apparatus that modulates measuring light to a rectangular wave signal having binary values at H level and L level, wherein durations at these levels are randomly changed, acquires the amounts of electric charges A0, A1, A2, and A3 in accordance with four kinds of timing signals, i.e., a first timing signal, which is a non-inverted signal of the modulation signal, a second timing signal, which is an inverted signal of the modulation signal, a third timing signal, which delays from the non-inverted signal of the modulation signal by one chip length Tc, and a fourth timing signal, which delays from the inverted signal of the modulation signal by one chip length Tc, and determines that the distance to an object is out of the measuring range due to shot noise or the like when the condition that $A0-A2=0$ is not satisfied.

SUMMARY OF INVENTION

As TOF cameras themselves are based on a lot of know-how, developers of an application apparatus with a TOF camera often incorporate a TOF camera purchased from a vendor. Developers of an application apparatus produce applications by using a distance image (a data group of distance values for the pixels) and a light intensity image (a data group of light intensity values for the pixels, obtained by radiating measuring light (generally, near-infrared (NIR) light), what is commonly called infrared (IR) images, NIR images, and the like) that the TOF camera outputs but the developers had to assume large errors, recorded on the specification and the like of the TOF camera, uniformly for the distance data of any pixel in the distance image.

As described above, however, TOF cameras are affected by random noise such as shot noise according to the theory of distance-measuring and there is a dispersion of distance values for each pixel and each execution of image-capturing (for each execution of distance-measuring). Further, the distance value may be inaccurate for each pixel and each execution of image-capturing due to external factors such as a movement of the object and a change in outside light. These factors also increase the margin of error of a TOF camera recorded on the specification and the like.

Thus, a versatile distance-measuring apparatus to allow the recognition of the error in the distance for each pixel is desired.

According to an aspect of the present disclosure, there is provided a distance-measuring apparatus including: a light emission section that executes an emission of measuring light, which is radiated to a target space to be measured; a plurality of light-sensitive elements that store electric charges in response to incident light from the target space to be measured; a distance calculation section that calculates a distance to an object in a direction of observation, for each pixel, based on amounts of electric charges which are respectively stored in light-sensitive elements at a plurality of timings that respectively delay by predefined phases from a timing of the emission of the measuring light, wherein the calculated distances are outputted from the distance-measuring apparatus; and a precision calculation section that calculates a precision of the distance, for each pixel, based on a relation among the amounts of the electric charges stored at the plurality of timings, wherein the calculated precisions are outputted from the distance-measuring apparatus.

BRIEF DESCRIPTION OF THE DRAWINGS

FIG. 5 illustrates changes in electric charges amounts resulting from a movement of the object, a change in outside light, and the like.

FIG. 6 is a histogram illustrating a dispersion of distance values for the same point for which a distance-measuring is executed, due to the effects of random noise, quantization errors, and the like.

FIG. 7 illustrates an array of precision data for image-capturing pixels corresponding to the pixels arrangement.

FIG. 8 illustrates distance data with singular values outputted.

DETAILED DESCRIPTION

Embodiments of the present disclosure will be described below in detail with reference to the attached drawings. Identical or similar features are denoted by identical or similar reference signs throughout the drawings. The embodiments described below do not limit the technical scope of the invention defined by the claims nor the meanings of the terms used therein.

Figure 1:
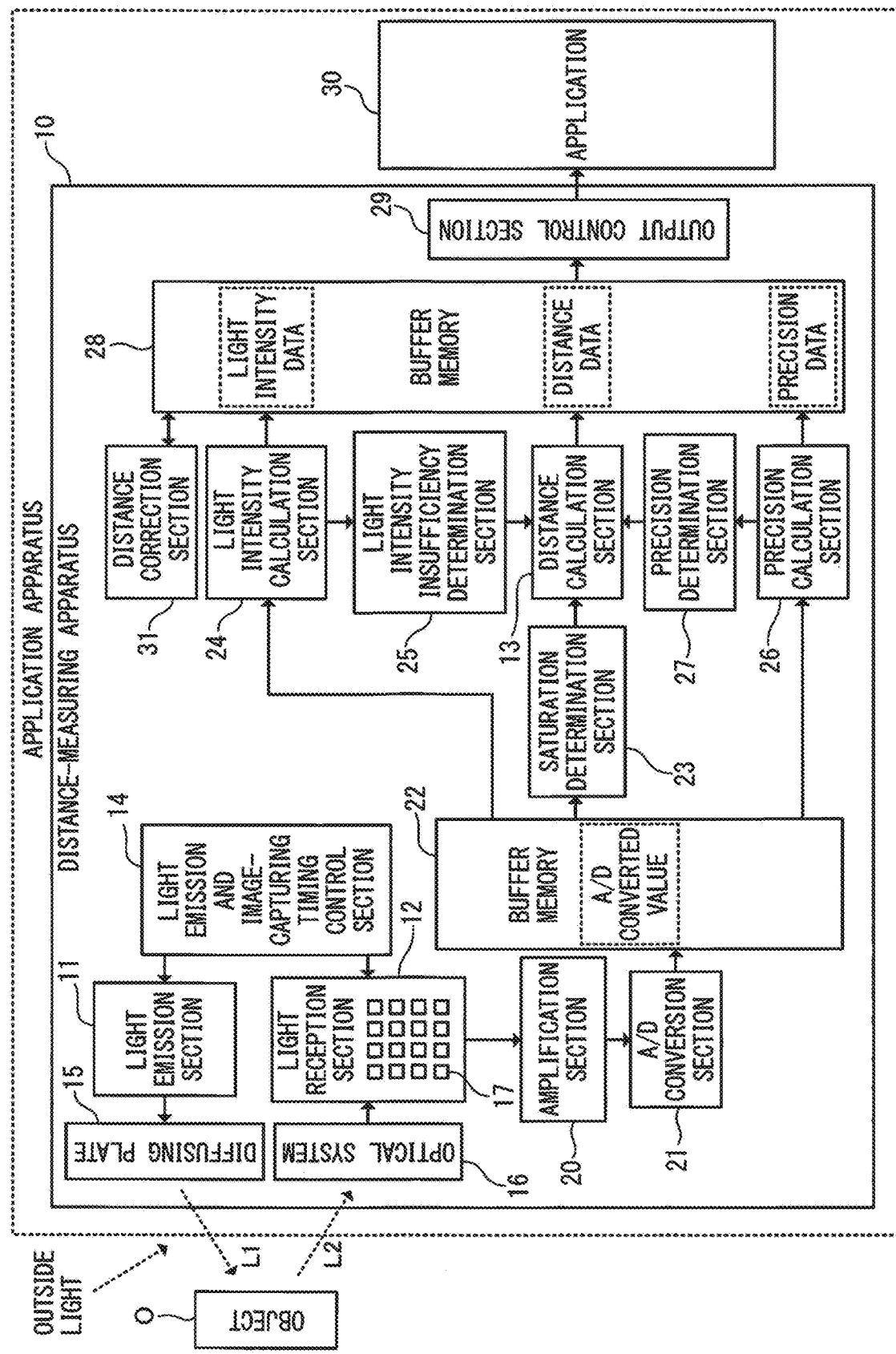
FIG. 1 is a block diagram illustrating a distance-measuring apparatus according to an embodiment.

FIG. 1 is a block diagram of a distance-measuring apparatus 10 according to the present embodiment. The distance-measuring apparatus 10 is, for example, a TOF camera that measures the distance to an object O by a phase difference method, and includes a light emission section 11 that emits measuring light L1, which is radiated to the target space to be measured, a light reception section 12 that receives incident light L2 from the target space to be measured, and a distance calculation section 13 that calculates the distance to the object O in the target space to be measured.

The light emission section 11 includes a light source, for example, a light-emitting diode (LED) or a laser diode (LD) that emits NIR light and the light emission section 11 emits measuring light L1, intensity-modulated at a certain period in accordance with a light emission timing signal received from a light emission and image-capturing timing control section 14. The modulated measuring light L1 may be a sine wave or a rectangular wave. The measuring light L1 is diffused by a diffusing plate 15 and radiated to the target space to be measured.

The light reception section 12 includes an image sensor such as, for example, a CCD or a CMOS provided with an NIR filter and receives incident light L2 through an optical system 16 that includes a condenser lens and the like. The incident light L2 includes outside light in addition to the measuring light reflected on the object O. The light reception section 12 includes light-sensitive elements 17 that store electric charges in response to the incident light L2, each of the light-sensitive elements 17 corresponds to one pixel. The light-sensitive elements 17 include, for example, photodiodes and capacitors and store electric charges for a certain image-capturing period at a plurality of image-capturing timings that respectively delay by certain phases from the timing of the emission of the measuring light L1 in accordance with image-capturing timing signals from the light emission and image-capturing timing control section 14.

Figure 2:
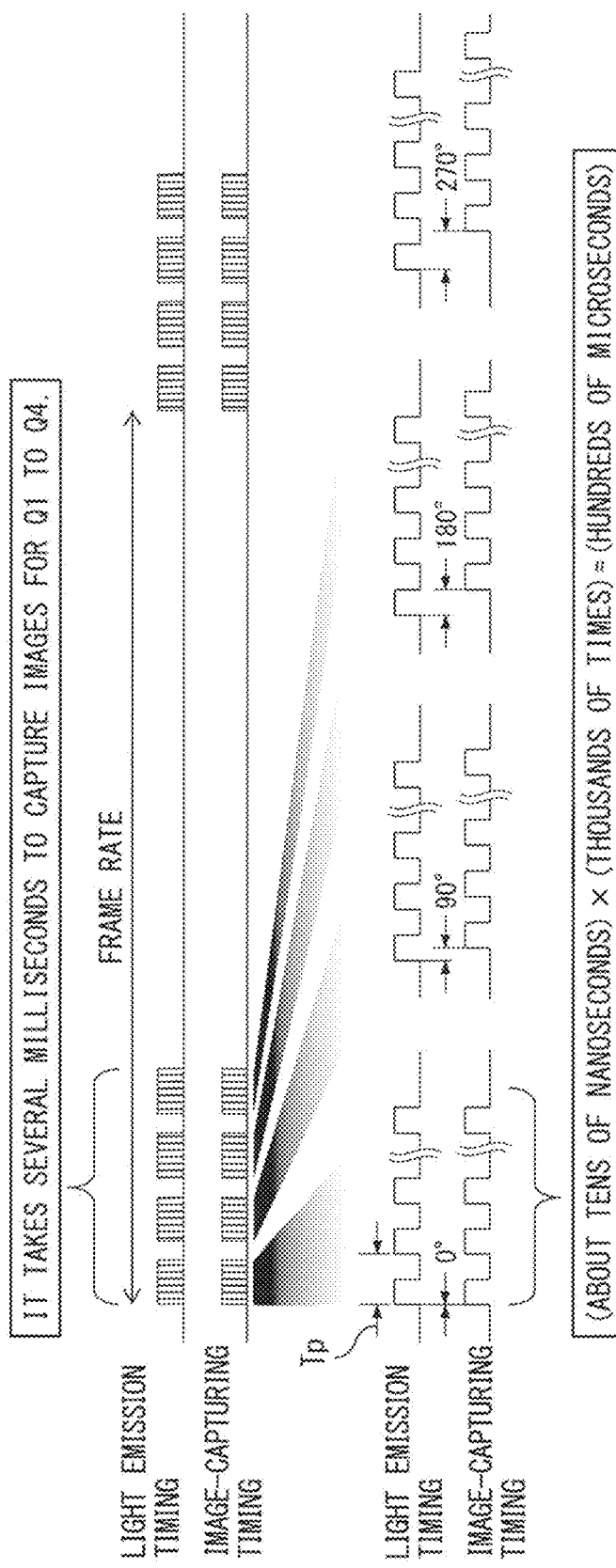
FIG. 2 is a timing chart illustrating an example of a light emission timing and an image-capturing timing of the distance-measuring apparatus.

FIG. 2 is a timing chart illustrating an example of a light emission timing and an image-capturing timing of the distance-measuring apparatus 10. The light-sensitive elements 17 store electric charges $Q_1$ to $Q_4$ at four kinds of image-capturing timings shifted in phase from the timing of the emission of the measuring light L1 by, for example, 0°, 90°, 180°, and 270°. According to the present embodiment, the priority is to improve spatial resolution and each light-sensitive element 17 acquires $Q_1$ to $Q_4$ in order, i.e., serially by capturing images at separate timings. The period Tp of the light emission pulse, which depends on the measuring range of the distance-measuring apparatus 10, is determined in advance and typically is tens of nanoseconds. For example, when the measuring range is 10 m, Tp is 67 ns from 10 m=c×Tp/2 (c is the speed of light ($3 \times 10^8$ m/s)). As one execution of image-capturing is not enough for storing sufficient electric charges, image-capturing is repeated consecutively several thousand times to store electric charges in appropriate amounts to acquire $Q_1$ to $Q_4$. Therefore, the image-capturing period for acquiring $Q_1$ to $Q_4$ adds up to several milliseconds.

Figure 3:
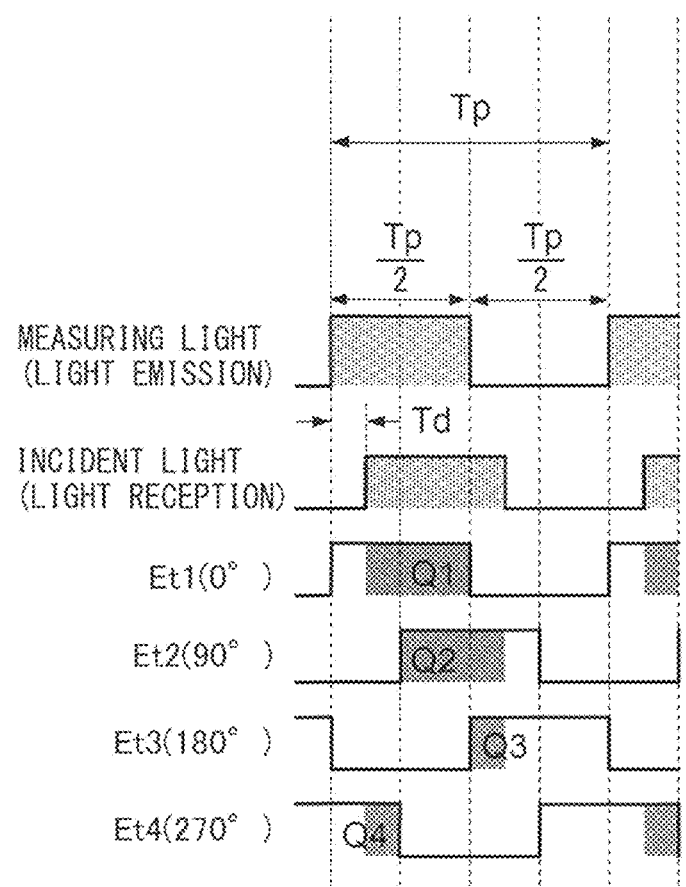
FIG. 3 illustrates an example of amounts of electric charges acquired at respective image-capturing timings.

FIG. 3 illustrates an example of the amounts of electric charges $Q_1$ to $Q_4$ acquired at respective image-capturing timings Et1 to Et4. It is assumed that the measuring light L1 is intensity-modulated with a modulation period Tp and the incident light L2 has a phase difference Td from the timing of the emission of the measuring light. In an ideal image-capturing with no error, the electric charge amounts $Q_1$ to $Q_4$ satisfy the relation described in the following known equation due to the phase relation among the four image-capturing timings Et1 to Et4. Herein D is a difference between the sum of the first electric charge amount $Q_1$ and the third electric charge amount $Q_3$ and the sum of the second electric charge amount $Q_2$ and the fourth electric charge amount $Q_4$.

$$D=|(Q_1+Q_3)-(Q_2+Q_4)|=0 \qquad \text{[Math 1]}$$

With reference to FIG. 1 again, after the light emission and image-capturing are executed a prescribed number of times in accordance with light emission timing signals and image-capturing timing signals from the light emission and image-capturing timing control section 14, the voltage values of the electric charge amounts $Q_1$ to $Q_4$ stored in the light reception section 12 are amplified by the amplification section 20, A/D converted by an A/D conversion section 21, and stored in buffer memory 22.

The saturation determination section 23 determines that a saturation has occurred when any of the values of the electric charge amounts $Q_1$ to $Q_4$ stored in and read out of the buffer memory 22 exceeds a prescribed value, and outputs the determination result to the distance calculation section 13 for each pixel and for each execution of image-capturing.

The light intensity calculation section 24 calculates light reception intensity I for each pixel and for each execution of image-capturing on the basis of the values of the electric charge amounts $Q_1$ to $Q_4$ stored in and read out of the buffer memory 22. Light reception intensity I is calculated from, for example, the following known equation. The calculated light intensity data is stored in buffer memory 28.

$$I = \frac{\sqrt{(Q_1 - Q_3)^2 + (Q_2 - Q_4)^2}}{2}$$ [Math 2]

When the light reception intensity I is below a prescribed value, a light intensity insufficiency determination section 25 determines that the light intensity is insufficient and outputs the determination result for each pixel and for each execution of image-capturing to the distance calculation section 13. Note that there is also a technique in which the determination of insufficiency of light intensity is based on whether or not all of the values of the electric charge amounts $Q_1$ to $Q_4$ stored in and read out of the buffer memory 22 are below a prescribed value.

Figure 4:
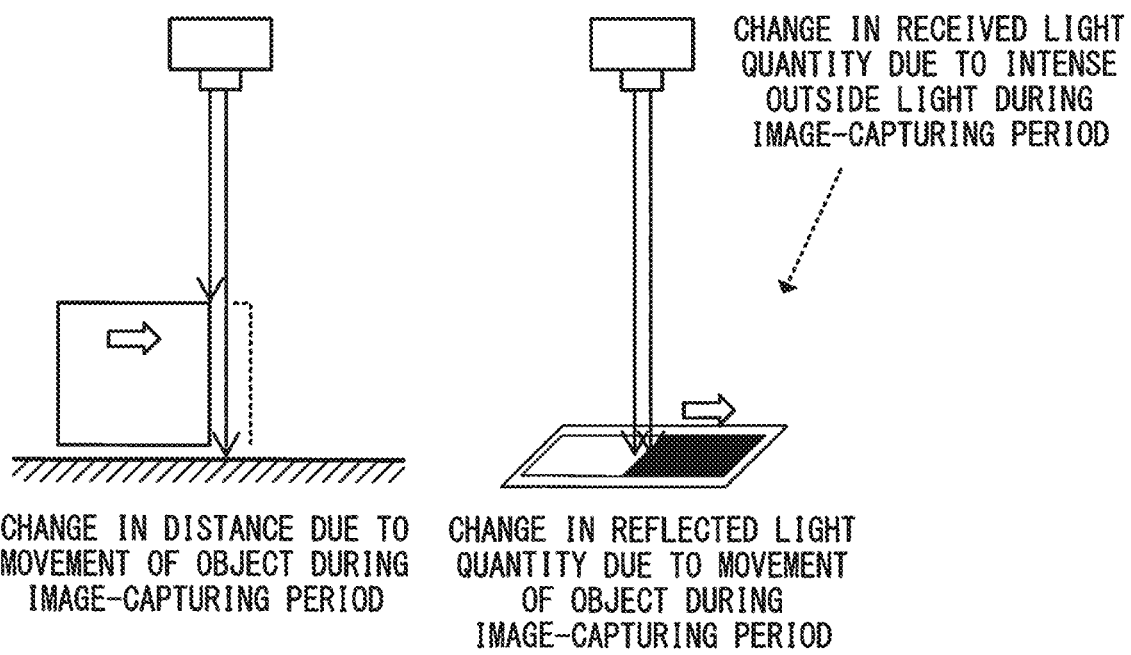
FIG. 4 illustrates a change in reflected light quantity and received light quantity due to external factors such as a movement of the object and a change in outside light during image-capturing.
Figure 5:
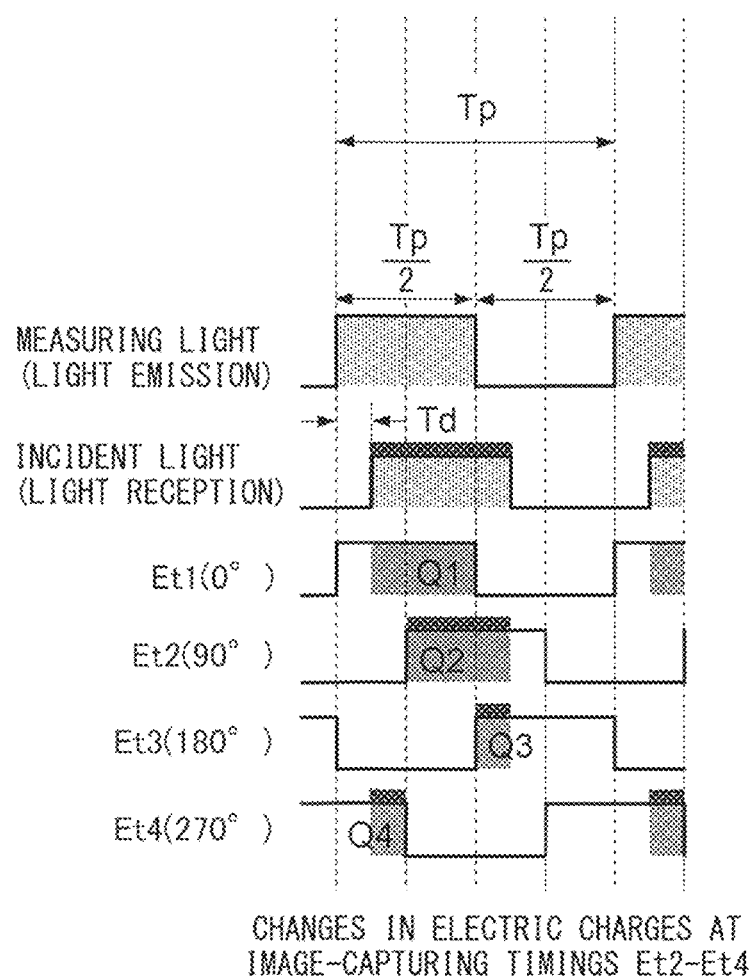

Further, as illustrated in FIG. 4, the reflected light quantity and the received light quantity may change due to external factors such as a movement of the object and a change in outside light during the image-capturing period. FIG. 5 illustrates changes in the electric charge amounts $Q_2$ to $Q_4$ resulting from an increase in the reflected light quantity and the received light quantity due to a movement of the object, a change in outside light, and the like during the executions of image-capturing at the image-capturing timings Et2 to Et4.

Figure 6:
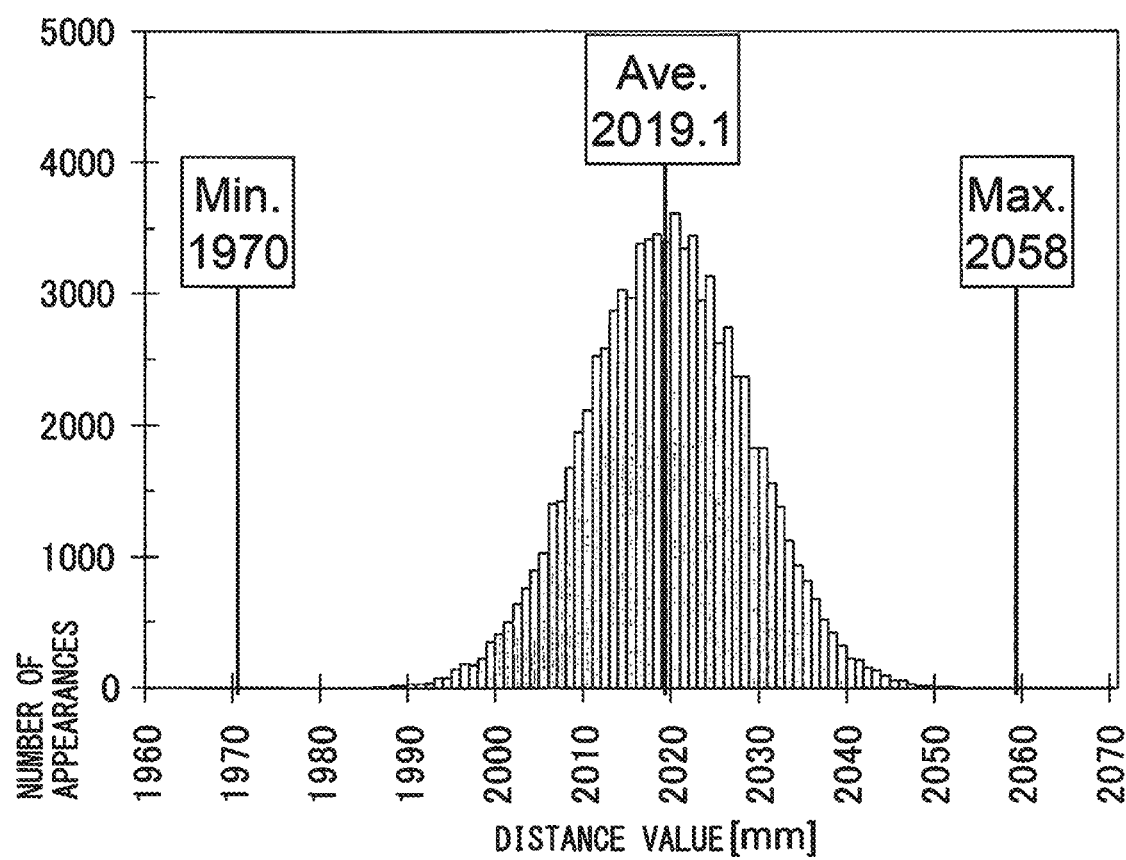

Further, in the distance-measuring apparatus 10, the electric charge amounts $Q_1$ to $Q_4$ and their read-out values are affected by random noise, quantization error due to A/D conversion, and the like according to the theory of distance-measuring, which results in a dispersion of distance values randomly distributed. FIG. 6 is a histogram illustrating a dispersion of distance values for the same point for which a distance-measuring is executed, due to the effects of random noise, quantization errors, and the like.

To address this, the distance-measuring apparatus 10 according to the present embodiment includes, as illustrated in FIG. 1, a precision calculation section 26 that calculates the precision of the distance for each pixel and for each execution of image-capturing on the basis of a relationship between the electric charge amounts in an ideal image-capturing with no error and a relationship between the actually acquired electric charge amounts $Q_1$ to $Q_4$. Like other calculation sections illustrated in FIG. 1, the precision calculation section 26 may be, for example, software for causing a processor, such as a central processing unit (CPU), of a computer to function. Alternatively, the precision calculation section 26 may be implemented, for example, as hardware such as a processor capable of executing at least a part of the processing done by the software.

The precision calculation section 26 calculates precision P from, for example, the following equation. Herein, D is the difference between the sum of the first electric charge amount $Q_1$ and the third electric charge amount $Q_3$ and the sum of the second electric charge amount $Q_2$ and the fourth electric charge amount $Q_4$, as described above, I is light reception intensity as described above, h is a correction factor, which is also used for expressing the precision in percentage, and e represents other errors anticipated in view of structural error, component characteristics, temperature characteristics, deterioration by aging, environmental conditions, and the like (i.e., margin). It is not indispensable to add e here and e may be written clearly in the specification of the distance-measuring apparatus 10 to allow the user of the distance-measuring apparatus to do the addition when necessary.

$$P = h\frac{D}{I} + e$$ [Math 3]

As the scale of the difference D changes depending on the lightness of the environment of the image-capturing, the scale of the difference D is adjusted by using the light reception intensity I in the calculation of the precision P. Further, e is a predefined constant greater than 0. Since the difference D is 0 in an ideal relation among the electric charge amounts, the precision P expresses a degree of abnormality, a precision P closer to 0 representing a high precision and a precision P farther away from 0 represents a lower precision. In another embodiment, the precision P may express a degree of normality. The precision P may be calculated in percentage. The calculated precision data is stored in the buffer memory 28.

FIG. 7 illustrates an array of precision data for image-capturing pixels corresponding to the pixels arrangement. With such precision data, it is possible to recognize that the precision is low not only at pixels with saturation or insufficient light intensity exposure but also at pixels affected by random noise, a movement of the object, a change in outside light, or the like. In other words, the developer of an application can discern the error for each pixel and for each execution of image-capturing on the basis of such precision data, which is helpful for improving the precision of applications for object detecting, shape recognition, and the like. Examples of specific applications include detection of a flow line of a human, gesture recognition, and counting of arriving and departing visitors.

The distance-measuring apparatus 10 further includes a precision determination section 27 that determines that the precision is inadequate when the precision P does not satisfy a prescribed precision and outputs the determination result to the distance calculation section 13 for each pixel and for each execution of image-capturing. Whether the precision is inadequate or not is determined by using, for example, the following equation, where k is a predefined constant greater than 0.

$$P > k$$ [Math 4]

The distance calculation section 13 calculates the distance to an object in the direction of observation for each pixel and for each execution of image-capturing on the basis of the values of the electric charge amounts $Q_1$ to $Q_4$ stored in and read out of the buffer memory 22. The distance L is calculated from, for example, the following known equation, where Td is a phase difference as described above, c is the speed of light as described above, and f is a frequency.

$$Td = \arctan\left(\frac{Q_2 - Q_4}{Q_1 - Q_3}\right)$$ [Math 5]

-continued $$L = \frac{c}{4\pi f} Td \quad \text{[Math 6]}$$

Further, the distance calculation section 13 outputs a singular value (for example, 9999) indicating saturation, a singular value (for example, 9998) indicating insufficiency of light intensity, and a singular value (for example, 9997) indicating inadequacy of precision instead of distance L in response to the determination results outputted by the above-described three determination sections, i.e., the saturation determination section 23, the light intensity insufficiency determination section 25, and the precision determination section 27. Note that the distance calculation section 13 may omit the calculation of distance L when outputting a singular value based on such a determination result. The distance data with the outputted singular value is stored in the buffer memory 28.

FIG. 8 illustrates distance data with singular values outputted. Such distance data prevents a wrong distance L from being outputted because, when the precision is inadequate, a singular value indicating inadequacy of precision (9997) is outputted instead of a distance L. Further, the developer of an application can identify the type among the newly added types of failure in distance-measuring (failure in distance-measuring due to random noise, a movement of the object, a change in outside light, quantization error due to A/D conversion, and the like) on the basis of the singular value.

With reference to FIG. 1 again, an output control section 29 outputs light intensity image data, distance image data, and precision image data to an application 30 based on the three sets of data stored in the buffer memory 28 i.e., the light intensity data, the distance data, and the precision data.

The distance-measuring apparatus 10 may also include a distance correction section 31 that corrects the distance L on the basis of the precision data and the distance data stored in the buffer memory 28. The distance correction section 31 may correct the distance by executing image processing such as average filter and median filter around the pixel with inadequate precision. Alternatively, the distance correction section 31 may correct the distance by calculating the weighted average of the distance values obtained from a plurality of executions of distance-measuring at one pixel or a plurality of distance values at a plurality of pixels in the neighborhood, the distance values respectively weighted with the inverses of the precisions of the distance values.

Figures 9, 10:
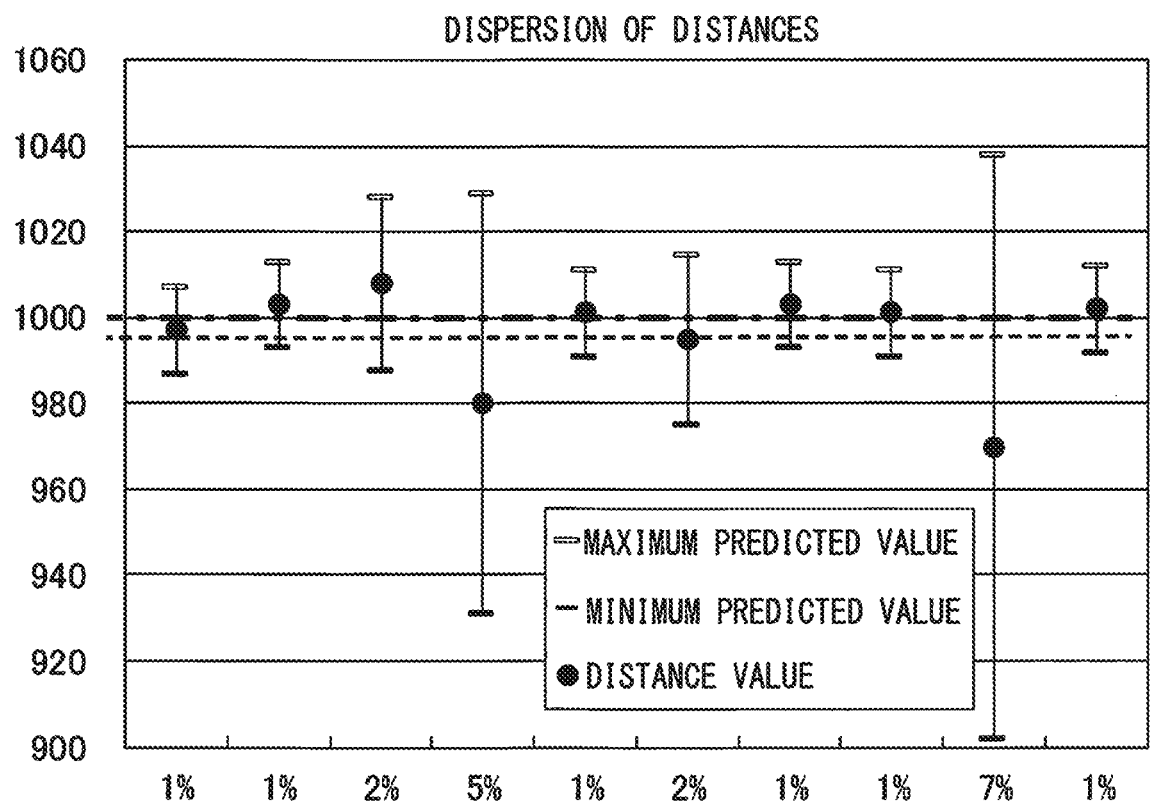
FIG. 9 is a graph illustrating a dispersion of distances.
FIG. 10 is a table illustrating an example of distance correction based on precision.

FIG. 9 is a graph illustrating a dispersion of distances and FIG. 10 is a table illustrating an example of distance correction based on precision. FIG. 9 illustrates, of an object disposed 1,000 mm away, distance values obtained from 10 executions of distance-measuring at one pixel or 10 distance values at 10 pixels in the neighborhood as well as respective maximum and minimum distance values predicted from the precisions (the values in percentage beneath the graph) of the distance values. Further, FIG. 10 lists the values of the distances illustrated in FIG. 9. The distance correction section 31 then calculates the weighted average (1,000.029 mm) of the distance values respectively weighted with the inverses of the precisions and corrects the distances at one pixel or the distances at 10 pixels by using the weighted average.

This example includes two small distance values (980 mm, 970 mm) by chance, which decrease the simple average, which turns out to be about 996 mm. In contrast, the weighted average using the inverses of the precisions turns out to be about 1,000 mm, where the effects of distance values with low precisions are reduced. In other words, it is possible to acquire a distance with a high precision with a small dispersion.

According to such an embodiment, the developer of the application 30 can acquire more precise distance values, which leads to an improvement in precision of object detection, shape recognition, and the like of the application. Further, the processing on the part of the application 30 for obtaining higher precision is simplified. As a result, a versatile distance-measuring apparatus 10 with higher precision is provided.

Although various embodiments have been described herein, it should be understood that the present invention is not limited to the above-described embodiments and various modifications can be made within the scope of the invention defined in the appended claims.

The invention claimed is:

1. A distance-measuring apparatus comprising:
   a light emission section configured to execute an emission of measuring light, which is radiated to a target space to be measured;
   a plurality of light-sensitive elements configured to store electric charges in response to incident light from the target space to be measured;
   a distance calculation section configured to calculate a distance to an object in a direction of observation, for each pixel, based on amounts of electric charges which are respectively stored in light-sensitive elements at a plurality of timings that have phases respectively delayed by 90 degrees from a timing of the emission of the measuring light, wherein the calculated distances are outputted from the distance-measuring apparatus; and
   a precision calculation section configured to calculate a precision of the distance, for each pixel, based on a relation among the amounts of the electric charges stored at the plurality of timings, wherein the calculated precisions are outputted from the distance-measuring apparatus,
   wherein the precision calculation section is configured to calculate the precision based on a difference between $(Q_1+Q_3)$ and $(Q_2+Q_4)$, where $Q_1$, $Q_2$, $Q_3$, and $Q_4$ respectively represent the amounts of the electric charges stored at four kinds of timings, and
   wherein the precision calculation section is further configured to adjust, using a light reception intensity of the incident light, a scale of the difference between $(Q_1+Q_3)$ and $(Q_2+Q_4)$.

2. The distance-measuring apparatus according to claim 1, wherein the precision calculation section is configured to calculate the precision based on a difference between the relation among the amounts of the electric charges in an ideal image-capturing with no error and the relation among the amounts of the electric charges actually acquired.

3. The distance-measuring apparatus according to claim 1, wherein the light-sensitive elements are configured to store electric charges at the four kinds of timings shifted from the timing of the emission by 0°, 90°, 180°, and 270°.

4. The distance-measuring apparatus according to claim 1, further comprising a precision determination section configured to determine that the precision for a pixel is inadequate when the precision for the pixel does not satisfy a prescribed precision,
   wherein the distance calculation section is configured to output, instead of the calculated distances, a value indicating that the precision is inadequate, for the pixel as to which the precision has been determined to be inadequate by the precision determination section.

5. The distance-measuring apparatus according to claim 4, wherein the value indicates inadequacy of precision due to at least one of random noise, a movement of the object, a change in outside light, and quantization error due to A/D conversion that occur while the electric charges are stored.

6. The distance-measuring apparatus according to claim 1, further comprising a distance correction section configured to correct the distance, based on the precision.

7. The distance-measuring apparatus according to claim 1, wherein
the precision calculation section is further configured to calculate the precision from following equation, $$P=h(D/I)$$

where
D is the difference between $(Q_1+Q_3)$ and $(Q_2+Q_4)$,
I is the light reception intensity, and
h is a correction factor.

8. The distance-measuring apparatus according to claim 1, wherein
the precision calculation section is further configured to calculate the precision from following equation, $$P=h(D/I)+e$$

where
D is the difference between $(Q_1+Q_3)$ and $(Q_2+Q_4)$,
I is the light reception intensity,
h is a correction factor, and
e represents other errors anticipated in view of structural error, component characteristics, temperature characteristics, deterioration by aging, or environmental conditions.

* * * * *